United States Patent
Tajammul et al.

(10) Patent No.: US 10,760,914 B2
(45) Date of Patent: Sep. 1, 2020

(54) COMPARATIVE METRICS FOR ROUTE PLANNING SCENARIOS

(71) Applicant: VERIZON PATENT AND LICENSING INC., Basking Ridge, NJ (US)

(72) Inventors: Faiza Tajammul, Rancho Santa Margarita, CA (US); Jefferson Ray Tan Hidayat, Christchurch (NZ); Brendan Ryan Bycroft, Christchurch (NZ); Hayden Sean White, Christchurch (NZ); Johanna Emily Read, Christchurch (NZ)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 243 days.

(21) Appl. No.: 15/850,762

(22) Filed: Dec. 21, 2017

(65) Prior Publication Data

US 2019/0195638 A1    Jun. 27, 2019

(51) Int. Cl.

| | |
|---|---|
| *G01C 21/34* | (2006.01) |
| *G06F 9/451* | (2018.01) |
| *G01C 21/20* | (2006.01) |
| *G06F 3/0481* | (2013.01) |
| *G01C 21/36* | (2006.01) |
| *G08G 1/00* | (2006.01) |
| *G06Q 10/08* | (2012.01) |

(52) U.S. Cl.
CPC .......... *G01C 21/343* (2013.01); *G01C 21/20* (2013.01); *G01C 21/34* (2013.01); *G01C 21/3453* (2013.01); *G01C 21/3611* (2013.01); *G06F 3/0481* (2013.01); *G06F 9/451* (2018.02); *G06Q 10/08* (2013.01); *G08G 1/202* (2013.01)

(58) Field of Classification Search
CPC ...... G01C 21/343; G01C 21/20; G01C 21/34; G01C 21/3453; G01C 21/3611; G06F 9/451; G06F 3/0481
See application file for complete search history.

(56) References Cited

U.S. PATENT DOCUMENTS

| | | | | |
|---|---|---|---|---|
| 6,601,233 | B1 * | 7/2003 | Underwood | G06F 8/24 717/100 |
| 8,214,238 | B1 * | 7/2012 | Fairfield | G06Q 10/063 705/7.11 |
| 10,102,536 | B1 * | 10/2018 | Hickman | G06Q 30/0205 |
| 2018/0017405 | A1 * | 1/2018 | Chen | G06O 50/30 |
| 2018/0342034 | A1 * | 11/2018 | Kislovskiy | G06Q 50/30 |

* cited by examiner

*Primary Examiner* — Behrang Badii
*Assistant Examiner* — Daniel L Greene

(57) ABSTRACT

A device can determine scenario information associated with a plurality of route planning scenarios. The scenario information can include information that describes, for each route planning scenario of the plurality of route planning scenarios, a condition or a configuration based on which a respective route plan is to be generated. The device can calculate, based on a plurality of route plans corresponding to the plurality of route planning scenarios, a set of metrics associated with the plurality of route planning scenarios. The set of metrics can be calculated based on a single user interaction with a user interface. The device can provide information associated with the set of metrics. The providing the information associated with the set of metrics can cause an action, associated with at least one route plan of the plurality of route plans, to be automatically performed.

20 Claims, 11 Drawing Sheets

| | Scenario 1 | Scenario 2: Removed Routes | Scenario 3: Added more jobs |
|---|---|---|---|
| Num Routes | 9 | 8 | 9 |
| Assigned Jobs | 77 | 78 | 87 |
| Unassigned Jobs | 1 | 0 | 0 |
| Drivers Used | 6 | 6 | 6 |
| Cost | $815.19 | $793.11 | $994.03 |
| Distance | 502.08 mi | 464.96 mi | 656.6 mi |
| Working Time | 43h 34m | 42h 53m | 52h 53m |
| Driving Time | 17h 36m | 16h 37m | 22h 7m |
| Violations | 0 | 12 | 1 |
| Last Modified | Last modified Oct. 19, 2017 | Last modified Oct. 19, 2017 | Last modified Oct. 19, 2017 |

FIG. 7B

COMPARATIVE METRICS FOR ROUTE PLANNING SCENARIOS

BACKGROUND

Route planning (sometimes referred to as route optimization) includes generating a route plan for completing a number of work orders in an efficient manner by, for example, minimizing distances traveled along routes of the route plan, minimizing amounts of time to complete the routes of the route plan, maximizing utilization of available resources and/or the like.

BRIEF DESCRIPTION OF THE DRAWINGS

FIGS. 5, 6, and 7A-7D are diagrams of example user interfaces associated with the example process of FIG. 4.

DETAILED DESCRIPTION OF PREFERRED EMBODIMENTS

Figure 1A:
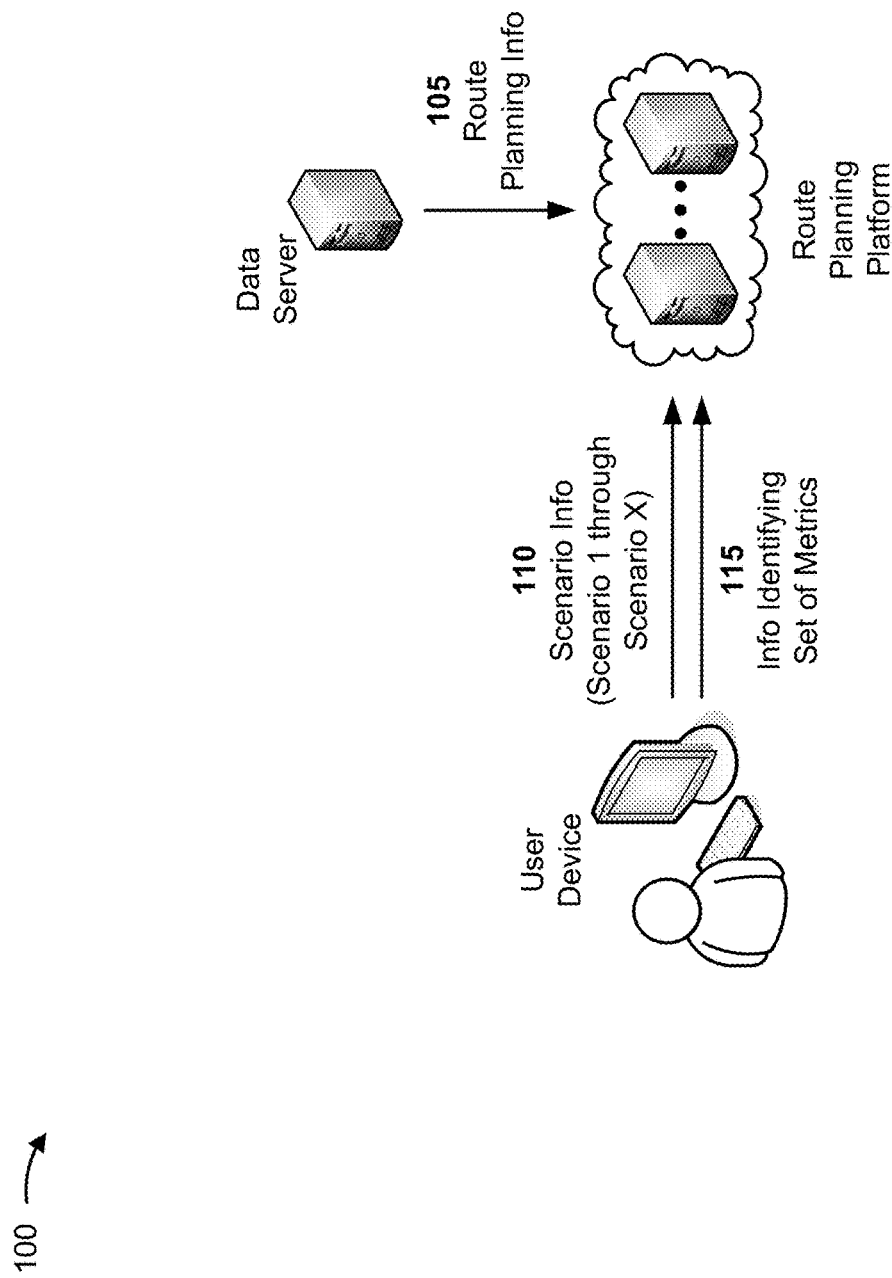
FIGS. 1A and 1B are diagrams of an overview of an example implementation described herein.

The following detailed description of example implementations refers to the accompanying drawings. The same reference numbers in different drawings can identify the same or similar elements.

A route planning platform can be capable of generating a route plan (e.g., information that identifies one or more routes) for completing a number of work orders. In some implementations, the route planning platform can generate the route plan based on route planning information that includes, for example, information associated with the work orders (e.g., locations, types, completion time windows, completion date windows, amounts of times to complete, attributes required for completion, and/or the like), information associated with drivers (e.g., shift availability, hours requirements, wages, attributes, and/or the like), and/or information associated with vehicles (e.g., types, capabilities, fuel costs, and/or the like).

In some cases, a user of the route planning platform can wish to compare metrics associated with different route plans, calculated for different route planning scenarios associated with the route planning information (e.g., such that the user can identify a most cost-effective route plan, a route plan with a shortest total driving time, a route plan with a number of violations that is below a threshold, and/or the like). Here, a given route planning scenario can be defined by for example, a change to resources (e.g., drivers or vehicles) identified in the route planning information, a change associated with work orders identified in the route planning information, a set of preferences associated with generating the route plan and/or the like. Additional details regarding such route planning scenarios are described below.

However, conventional techniques for generating such a metric for each route planning scenario are resource intensive and do not allow the metric to be readily compared across the different route planning scenarios. For example, for each route planning scenario, after a respective route plan is generated, the metric can be calculated through multiple user interactions with multiple user interfaces (e.g., via multiple linked spreadsheets). Here, even when the metric is calculated for each route planning scenario, comparison of the metric across the different route planning scenarios is not readily achievable (e.g., since different user interfaces can be used to convey the metric for each route planning scenario and since the metric is not calculated or displayed for each route planning scenario at the same time). Thus, the conventional techniques result in inefficient use of computing resources (e.g., processing time, battery power, and/or the like) and fail to provide an output that facilitates comparison of a metric among different route planning scenarios.

Some implementations described herein provide a route planning platform for calculating a set of metrics for a plurality of route planning scenarios and providing, for display, information associated with the set of metrics (e.g., for comparison by a user). In some implementations, the route planning platform can calculate the set of metrics based on a single user interaction (e.g., a so-called "one-click" interaction), and can provide the information associated with the set of metrics for display via a single user interface, thereby improving efficiency in use of computing resources while providing an output that facilitates comparison of the set of metrics for the plurality of route planning scenarios.

Figure 1B:
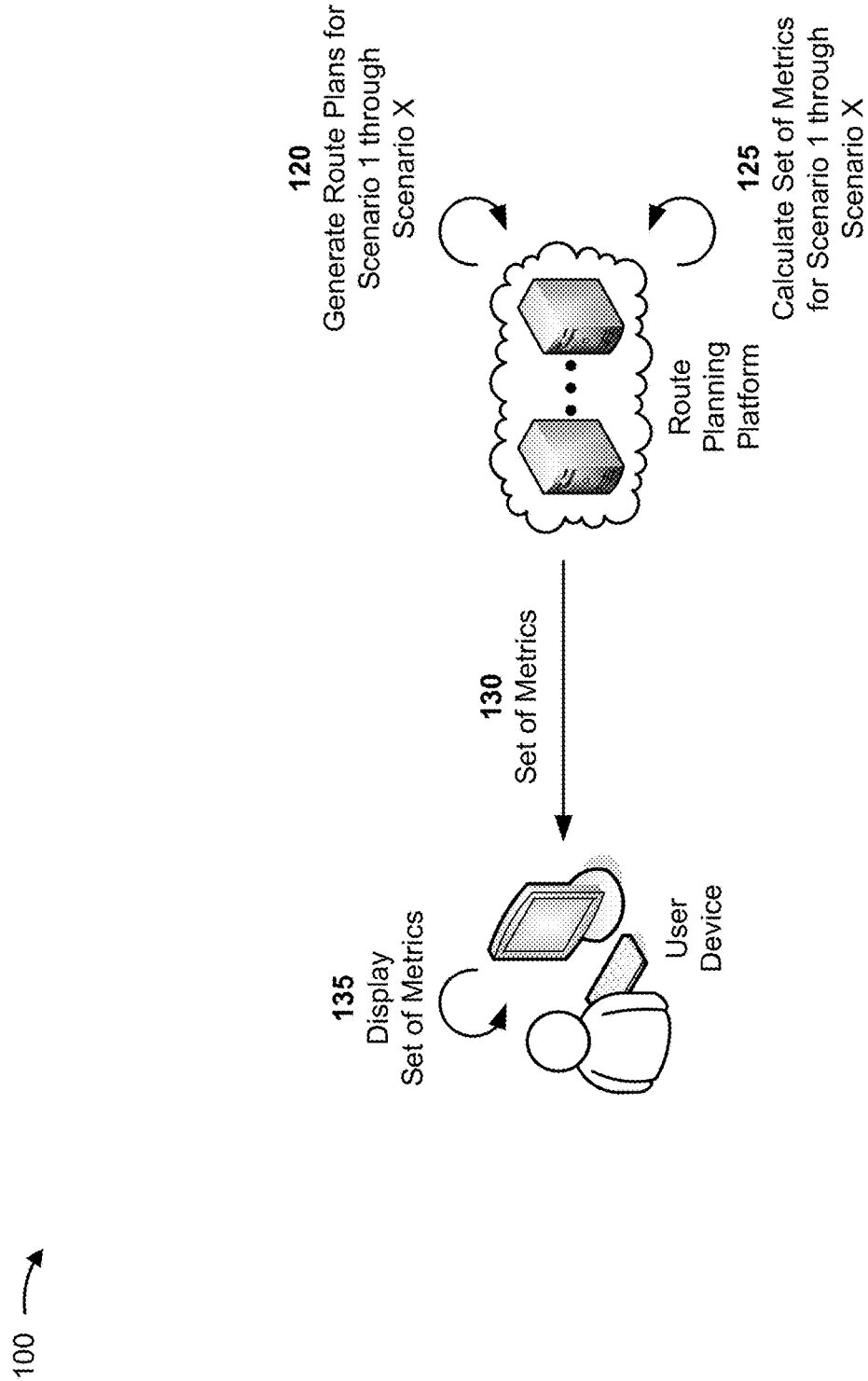

FIGS. 1A and 1B are diagrams of an overview of an example implementation 100 described herein. Example implementation 100 is an example of a route planning platform calculating a set of metrics, associated with a plurality of route planning scenarios (e.g., Scenario 1 through Scenario X), and providing information associated with the set of metrics for display to a user (e.g., such that the user can view the information associated with the set of metrics for the plurality of route planning scenarios).

As shown in FIG. 1A, and by reference number 105, a route planning platform can determine route planning information based on which a plurality of route plans, associated with the plurality of route planning scenarios, can be generated. The route planning information can include work order information, driver information, and/or vehicle information, as described herein. As shown, the route planning platform can determine the route planning information based on information provided by another device, such as a data server that stores the route planning information. In some implementations, the route planning platform can determine the route planning information before or after route planning platform receives scenario information, associated with the plurality of route planning scenarios, as described below.

As shown by reference number 110, the route planning platform can determine the scenario information associated with a plurality of route planning scenarios. A route planning scenario can include a scenario based on which a route plan is to be generated for given route planning information. For example, the route planning scenario can include a scenario designed to cause a route plan, generated based on the route planning information, to require an amount of driver overtime that satisfies a threshold, to address customer demand in a manner that satisfies a threshold, to assume an increase or a decrease in available resources identified in the route planning information, to assume an increase or decrease in a number of work orders identified in the route planning information, and/or the like.

For a given route planning scenario, the scenario information can include information that describes a condition based on which a route plan, associated with the given route planning information, is to be generated. For example, in some implementations, the scenario information can include information that describes conditions described in association with the above examples of route planning scenarios, such as information that identifies an overtime threshold, information that identifies a customer demand threshold, information that identifies an increase or a decrease to available resources, information that identifies an increase or a decrease in a number of work orders, and/or the like. Further, in some implementations, the scenario information can include information that identifies a configuration associated with the given route planning scenario. The configuration can include a preference, a constraint, a setting, and/or the like, associated with generating a route plan for the route planning scenario.

As shown in FIG. 1A, in some implementations, route planning platform can determine the scenario information based on user input (e.g., provided via a user device). For example, the user can provide the scenario information (e.g., information associated with the plurality of route planning scenarios, information that identifies the plurality of route planning scenarios, and/or the like) as user input at the user device. Here, based on a user interaction at the user device (e.g., a click of a "Compare" button) the user device can provide the scenario information to the route planning platform. Thus, as described below, the route planning platform can be caused to calculate the set of metrics, associated with the plurality of route planning scenarios, based on a single user interaction.

As shown by reference number 115, in some implementations, the route planning platform can determine information that identifies the set of metrics. The set of metrics can include one or more metrics based on which the plurality of route planning scenarios can be compared such as one or more worker order metrics, driver metrics, vehicle metrics, cost metrics, revenue metrics, and/or the like, examples of which are described below. As shown, in some implementations, the information that identifies the set of metrics can be received from the user device. Additionally, or alternatively, the information that identifies the set of metrics can be determined based on information stored or accessible by the route planning platform (e.g., when a default or preconfigured set of metrics is to be calculated).

As shown in FIG. 1B, and by reference number 120, the route planning platform can generate a plurality of route plans, where each route plan corresponds to a respective route planning scenario of the plurality of route planning scenarios. In some implementations, the route planning platform can generate the plurality of route plans based on the route planning information and the scenario information associated with the plurality of route planning scenarios. In other words, the route planning platform can generate each route plan based on the route planning information and scenario information associated with a corresponding route planning scenario (e.g., a scenario associated with a particular condition and/or a particular configuration). In some implementations, the route planning platform can generate the plurality of route plans based on a route planning algorithm stored or accessible by the route planning platform.

As shown by reference number 125, the route planning platform can calculate, based on the plurality of route plans, the set of metrics associated with the plurality of route planning scenarios. In some implementations, the route planning platform can calculate the set of metrics such that calculation of a first metric is completed before calculation of a second metric is completed (e.g., in order to allow information associated with the first metric to be provided before information associated with the second metric is provided).

As shown by reference number 130, the route planning platform can provide information associated with the set of metrics for display at the user device. As indicated above, in some cases, the route planning platform can provide information associated with a first metric before providing information associated with a second metric (e.g., such that the information associated with the first metric can be displayed while the second metric before the route planning platform finishes calculating the second metric).

As shown by reference number 135, the user device, upon receiving the information associated with the set of metrics, can provide the information associated with the set of metrics for display (e.g., such that the user can view the information associated with the set of metrics). In some implementations, the information associated with the set of metric can be provided for display via a single user interface that facilitates comparison of the set of metrics across the plurality of route planning scenarios.

In this way, a route planning platform can calculate a set of metrics for a plurality of route planning scenarios and provide, for display, information associated with the set of metrics (e.g., for comparison by a user). As described above, in some implementations, the route planning platform can calculate the set of metrics based on a single user interaction and can provide the information associated with the set of metrics for display via a single user interface, thereby improving efficiency in use of computing resources while providing an output that facilitates comparison of the set of metrics for the plurality of route planning scenarios.

As indicated above, FIGS. 1A and 1B are provided merely as examples. Other examples are possible and can differ from what was described with regard to FIGS. 1A and 1B.

Figure 2:
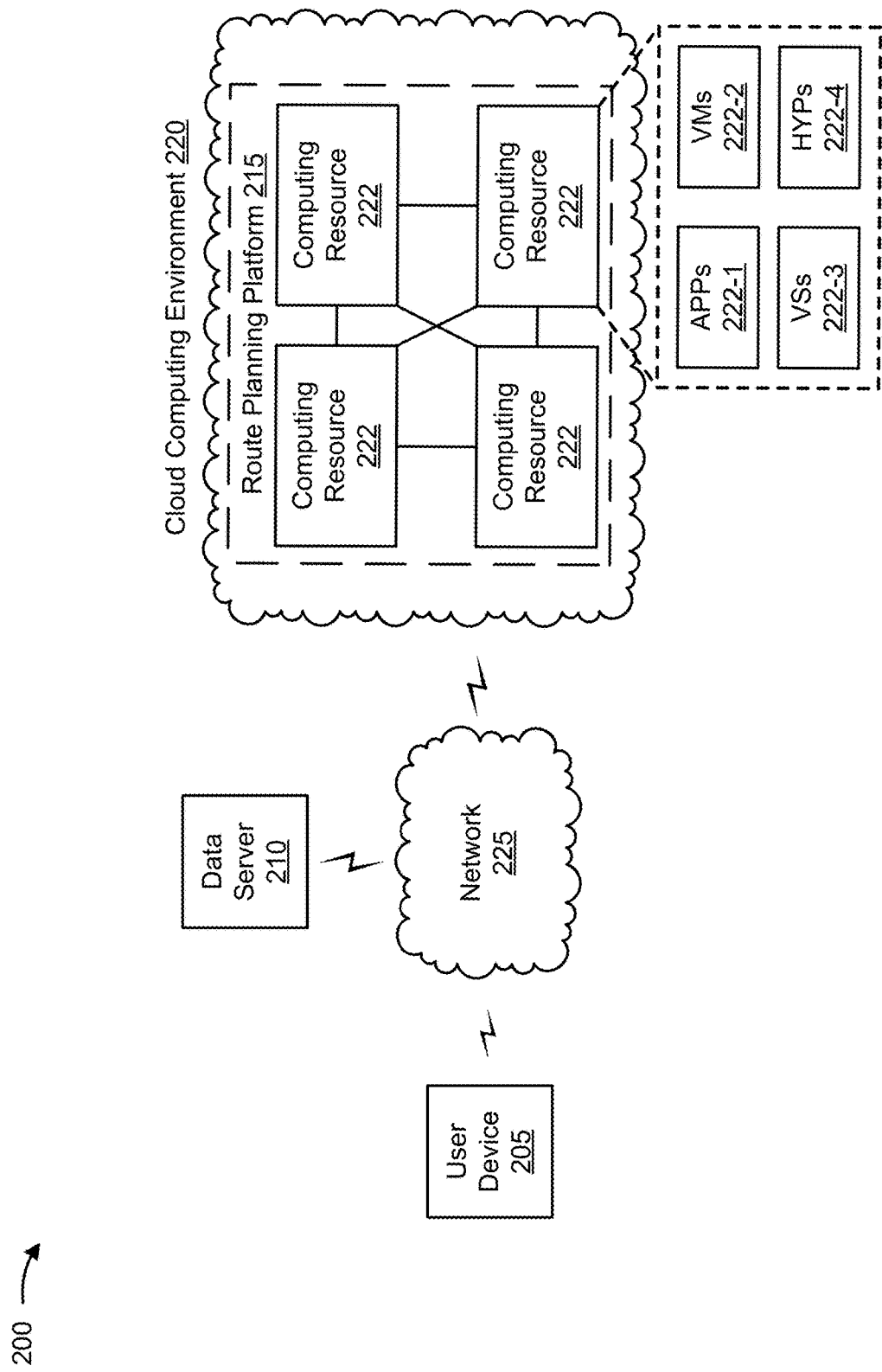
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a data server 210, a route planning platform 215 hosted in a cloud computing environment 220, and a network 225. Devices of environment 200 can interconnect via wired connections, wireless connections, or a combination of wired and wireless connections.

User device 205 includes one or more devices capable receiving, determining, storing, processing, and/or providing scenario information associated with a plurality of route planning scenarios and/or information that identifies a set of metrics associated with the plurality of route planning scenarios. For example, user device 205 can include a communication and computing device, such as a mobile phone (e.g., a smart phone, a radiotelephone, etc.), a laptop computer, a tablet computer, a handheld computer, a desktop computer, a wearable communication device (e.g., a smart wristwatch, a pair of smart eyeglasses, a sensor, etc.), or a similar type of device. In some implementations, user device 205 includes one or more devices capable of providing, for display, information associated with the set of metrics (e.g., after the set of metrics is calculated by route planning platform 215).

Data server 210 includes one or more devices capable of receiving, determining, storing, processing, and/or providing route planning information associated with a plurality of route planning scenarios. For example, data server 210 can include a server or a group of servers. In some implementations, data server 210 can store the route planning information (e.g., such that data server 210 can provide the route planning information to route planning platform 215). In some implementations, data server 210 can be hosted in cloud computing environment 220, is not cloud-based (i.e., can be implemented outside of a cloud computing environment), or can be partially cloud-based.

Route planning platform 215 includes one or more devices capable of calculating, based on scenario information and route planning information associated with a plurality of route planning scenarios, a set of metrics for the plurality of route planning scenarios, and providing information associated with the set of metrics (e.g., to user device 205). For example, route planning platform 215 can include a server or a collection of servers.

In some implementations, as shown, route planning platform 215 can be hosted in cloud computing environment 220. Notably, while implementations described herein describe route planning platform 215 as being hosted in cloud computing environment 220, in some implementations, route planning platform 215 is not cloud-based (i.e., can be implemented outside of a cloud computing environment) or can be partially cloud-based.

Cloud computing environment 220 includes an environment that delivers computing as a service, whereby shared resources, services, etc. can be provided to route planning platform 215. Cloud computing environment 220 can provide computation, software, data access, storage, and/or other services that do not require end-user knowledge of a physical location and configuration of a system and/or a device that delivers the services. As shown, cloud computing environment 220 can include a group of computing resources 222 (referred to collectively as computing resources 222 and individually as computing resource 222).

Computing resource 222 includes one or more personal computers, workstation computers, server devices, or another type of computation and/or communication device. In some implementations, computing resource 222 can host route planning platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that can be provided to or accessed by user device 205. Application 222-1 can eliminate a need to install and execute the software applications on user device 205. For example, application 222-1 can include software associated with route planning platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system ("OS"). A process virtual machine can execute a single program, and can support a single process. In some implementations, virtual machine 222-2 can execute on behalf of a user (e.g., user device 205), and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
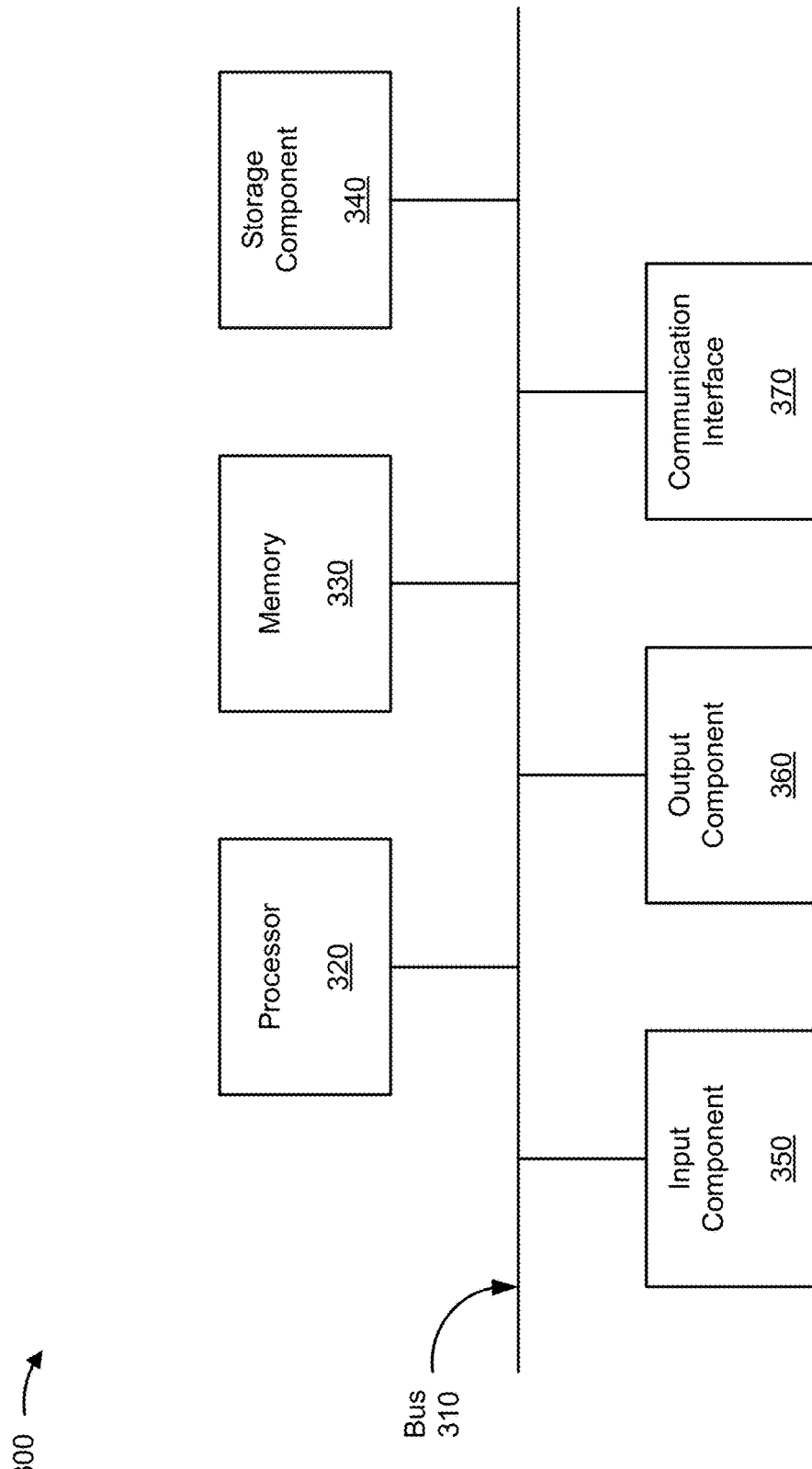
FIG. 3 is a diagram of example components of one or more devices of FIG. 2.

FIG. 3 is a diagram of example components of a device 300. Device 300 can correspond to user device 205, data server 210, route planning platform 215, and/or computing resource 222. In some implementations, user device 205, data server 210, route planning platform 215, and/or computing resource 222 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
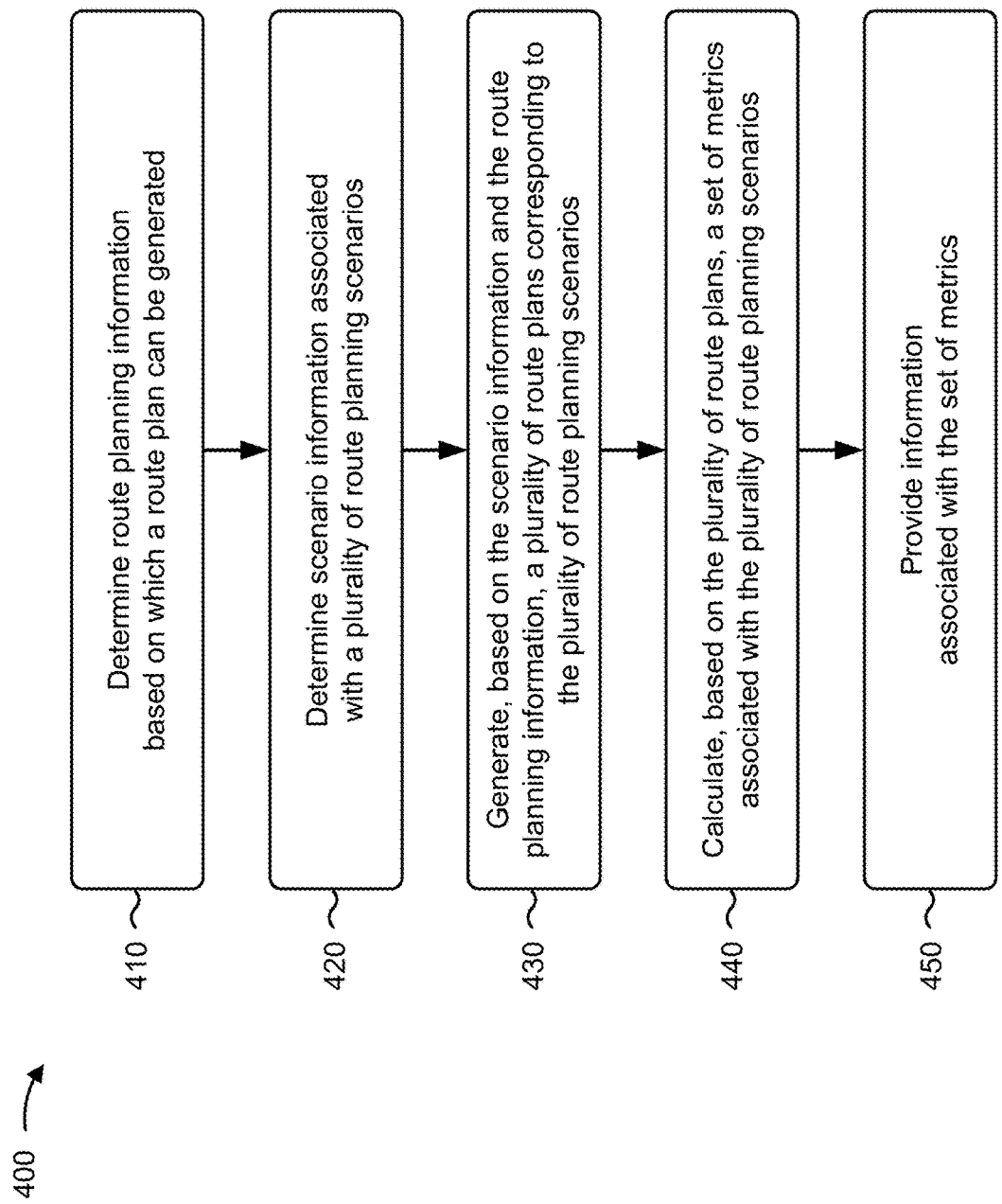
FIG. 4 is a flow chart of an example process for calculating a set of metrics for a plurality of route planning scenarios and providing, for display, information associated with the set of metrics.

FIG. 4 is a flow chart of an example process 400 for calculating a set of metrics for a plurality of route planning scenarios and providing, for display, information associated with the set of metrics. In some implementations, one or more process blocks of FIG. 4 can be performed by route planning platform 215. In some implementations, one or more process blocks of FIG. 4 can be performed by another device or a group of devices separate from or including route planning platform 215, such as user device 205 and/or data server 210.

As shown in FIG. 4, process 400 can include determining route planning information based on which a route plan can be generated (block 410). For example, route planning platform 215 can determine route planning information based on which a route plan can be generated.

The route planning information can include information based on which route planning platform 215 can generate one or more route plans. For example, the route planning information can include work order information, driver information, and/or vehicle information, as described above.

The work order information can include information associated with work orders to be completed based on a route plan. For example, for a given work order, the work order information can include information that identifies the work order (e.g., a work order identification number, a work order name, and/or the like), information that identifies a location associated with the work order (e.g., an address, a set of GPS coordinates, and/or the like), information that identifies a type of the work order (e.g., weekly, monthly, and/or the like), information that identifies a completion time or time window associated with the work order (e.g., 9:00 a.m. to 12:00 p.m., after 3:00 p.m., and/or the like), information that identifies a completion date or date window associated with the work order (e.g., November 2, from December 1 to December 3, and/or the like), information that identifies an allowable amount of on-site time to complete the work order (e.g., 5 minutes, 30 minutes, and/or the like), information that identifies an attribute required to complete the work order (e.g., a license, a certification, a security clearance, and/or the like), and/or another type of information. In some implementations, the route planning information can include work order information associated with multiple work orders (e.g., tens, hundreds, or thousands of work orders).

The driver information can include information associated with one or more drivers that can be scheduled in association with executing the route plan. For example, for a given driver, the driver information can include information that identifies the driver (e.g., a driver identification number, a driver name, and/or the like), information that identifies availability of the driver (e.g., shift availability, a maximum number of hours per week, and/or the like), information that identifies a cost associated with the driver (e.g., an normal hourly wage, an overtime wage, and/or the like), information that identifies an attribute of the driver (e.g., a type of license, a certification, a security clearance, and/or the like), information that identifies a preferred vehicle of the driver (e.g., type of preferred vehicle, a specific vehicle, and/or the like), information that identifies a location associated with the driver (e.g., a starting and/or ending address, starting and/or ending GPS coordinates, and/or the like), and/or another type of information. In some implementations, the route planning information can include driver information associated with multiple drivers (i.e., the route planning information can including information relating to each driver in a workforce of drivers that can be scheduled in association with executing the route plan).

The vehicle information can include information associated with one or more vehicles that can be scheduled in association with executing the route plan. For example, for a given vehicle, the vehicle information can include information that identifies the vehicle (e.g., a vehicle identification number, a vehicle name, and/or the like), information that identifies a type of the vehicle (e.g., a van, a truck, and/or the like), information that identifies a location associated with the vehicle (e.g., a starting and/or ending address, starting and/or ending GPS coordinates, and/or the like), information that identifies an attribute of the vehicle (e.g., a height, a length, a weight, a capacity, a volume, and/or the like), information that identifies a cost associated with the vehicle (e.g., a fixed cost, a fuel cost per kilometer, a maintenance cost per mile, and/or the like), information that identifies a capability of the vehicle (e.g., refrigeration, hazardous material transportation, and/or the like), and/or another type of information. In some implementations, the vehicle information can collected, gathered, measured, or otherwise obtained by one or more sensors associated with a given vehicle. In such a case, route planning platform 215 can receive the vehicle information in a transmission from the vehicle. In some implementations, the route planning information can include vehicle information associated with multiple vehicles (i.e., the route planning information can including information relating to each vehicle in a pool of vehicles that can be used in association with executing the route plan).

In some implementations, route planning platform 215 can determine the route planning information based on receiving the route planning information from another device, such as user device 205 (e.g., when a user provides the route planning information via user input to user device 205), data server 210 (e.g., when data server 210 stores or has access to the route planning information), and/or the like.

In some implementations, route planning platform 215 can determine the route planning information based on an indication to generate one or more route plans. For example, route planning platform 215 can receive scenario information associated with a plurality of route planning scenarios, as described below. Here, the receipt of the scenario information can serve as an indication that route planning platform 215 is to generate a plurality of route plans, where each route plan corresponds to a different route planning scenario. In this example, route planning platform 215 can determine the route planning information based on receiving the scenario information by, for example, requesting the route planning information from user device 205 and/or data server 210. Alternatively, route planning platform 215 can determine the route planning information before receiving the scenario information (e.g., when route planning platform 215 has received and stored the route planning information at an earlier time.

As further shown in FIG. 4, process 400 can include determining scenario information associated with a plurality of route planning scenarios (block 420). For example, route planning platform 215 can determine scenario information associated with a plurality of route planning scenarios.

A route planning scenario includes a scenario based on which a route plan is to be generated for given route planning information. For example, the route planning scenario can include a scenario designed to cause a route plan, generated based on the route planning information, to require an amount of driver overtime that satisfies a threshold (e.g., less than 100 hours, less than 4 hours per driver, and/or the like). As another example, the route planning scenario can include a scenario designed to cause a route plan, generated based on the route planning information, to address customer demand in a manner that satisfies a threshold (e.g., such that 95% of work orders are completed within their respective time windows, such that 100% of work orders are scheduled for completion by the route plan, and/or the like). As another example, the route planning scenario can include a scenario designed to cause a route plan, generated based on the route planning information, to assume an increase or a decrease in available resources identified in the route planning information (e.g., an additional 3 vehicles, a 7% reduction in a number of drivers, and/or the like). As another example, the route planning scenario can include a scenario designed to cause a route plan, generated based on the route planning information, to assume an increase or decrease in a number of work orders identified in the route planning information (e.g., a 15% increase, a 20% increase, a 3% decrease, and/or the like). In some implementations, the route planning scenario can include another type of scenario and/or a scenario that combines, for example, two or more of scenarios (e.g., two or more of the above example scenarios).

In some implementations, scenario information, associated a route planning scenario, can include information that describes a condition based on which a route plan, associated with a given route planning information, is to be generated. For example, in some implementations, the scenario information can include information that describes conditions described in association with the above examples of route planning scenarios, such as information that identifies an overtime threshold, information that identifies a customer demand threshold, information that identifies an increase or a decrease to available resources, information that identifies an increase or a decrease in a number of work orders, and/or the like.

Additionally, or alternatively, the scenario information can include information that identifies a configuration associated with the route planning scenario. The configuration can include a preference, a constraint, a setting, and/or the like, associated with generating a route plan for the route planning scenario. For example, the configuration can include an indication of whether historic traffic data is to be taken into account when generating the route plan for the route planning scenario. As another example, the configuration can including an indication of whether front loading (e.g., completing work orders as early as possible within their respective date windows) should be attempted when generating the route plan for the route planning scenario. As another example, the configuration can include an indication of whether vehicles are permitted to return to a start location during a route (e.g., such that the vehicles can be used for multiple routes). As another example, the configuration can include an indication of whether time windows can be violated when generating the route plan for the route planning scenario (e.g., such that some work orders can be planned for completion outside of their respective time windows). As another example, the configuration information can include an indication of whether maximum route times can be violated when generating the route plan for the route planning scenario. In some implementations, the scenario information can include information associated with another type of configuration and/or information associated with multiple configurations.

In some implementations, route planning platform 215 can determine the scenario information based on user input. For example, a user can provide the scenario information via user input at user device 205. Here, for each route planning scenario identified in the route planning information, the scenario information can include information that describes a condition based on which a route plan is to be generated and/or a configuration associated with the route planning scenario.

Figure 5:
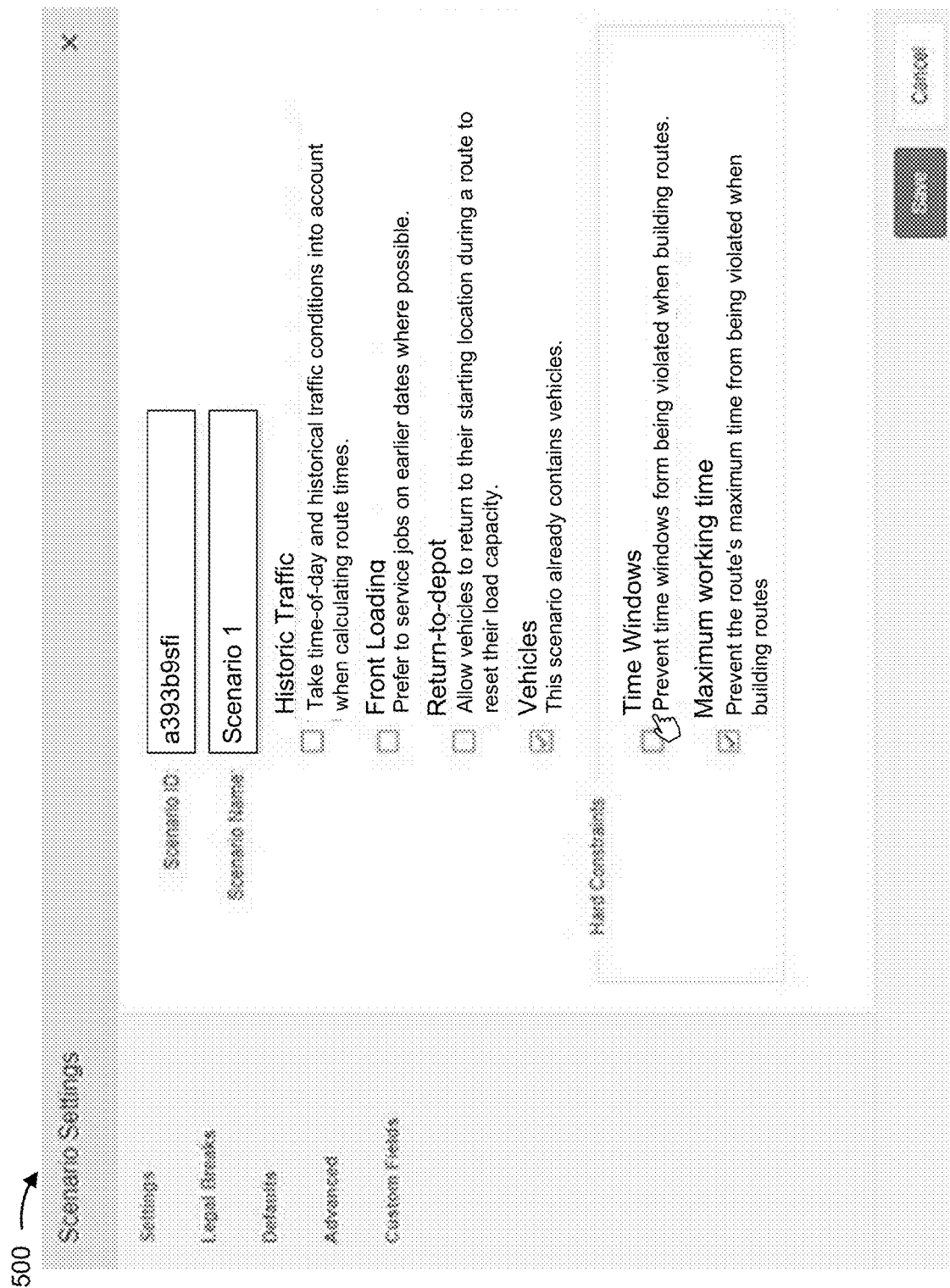

FIG. 5 is a diagram of an example user interface 500 via which a user can provide scenario information, associated with a route planning scenario, in the form of user input to user device 205. As shown in FIG. 5, the user can select one or more configurations (e.g., a configuration associated with using historic traffic data, a configuration associated with attempting front loading, a configuration associated with allowing a vehicle to return to a depot, a configuration associated with violation of work order time windows, and a configuration associated with violating maximum route times) associated with a given scenario (e.g., Scenario 1). While not shown, the user can also provide information associated with one or more conditions associated with the given scenario (e.g., via another user interface). The user can provide scenario information associated with one or more additional route planning scenarios in a similar manner (e.g., where scenario information associated with each route planning scenario is stored on user device 205).

In this example, after the user provides the scenario information via user device 205, user device 205 can provide the scenario information, associated with the plurality of route planning scenarios, to route planning platform 215. In some implementations, user device 205 can provide the scenario information to route planning platform 215 based on an indication to calculate a set of metrics associated with the plurality of route planning scenarios, as described below. As indicated above, FIG. 5 is provided merely as an example. Other examples are possible and can differ from what was described with regard to FIG. 5.

As another example, a user can provide information that identifies the plurality of route planning scenarios by, for example, selecting identifiers associated with the plurality of route planning scenarios (e.g., scenario names) via a user interface displayed on user device 205 (e.g., from a list, a drop down menu, and/or the like).

Figure 6:
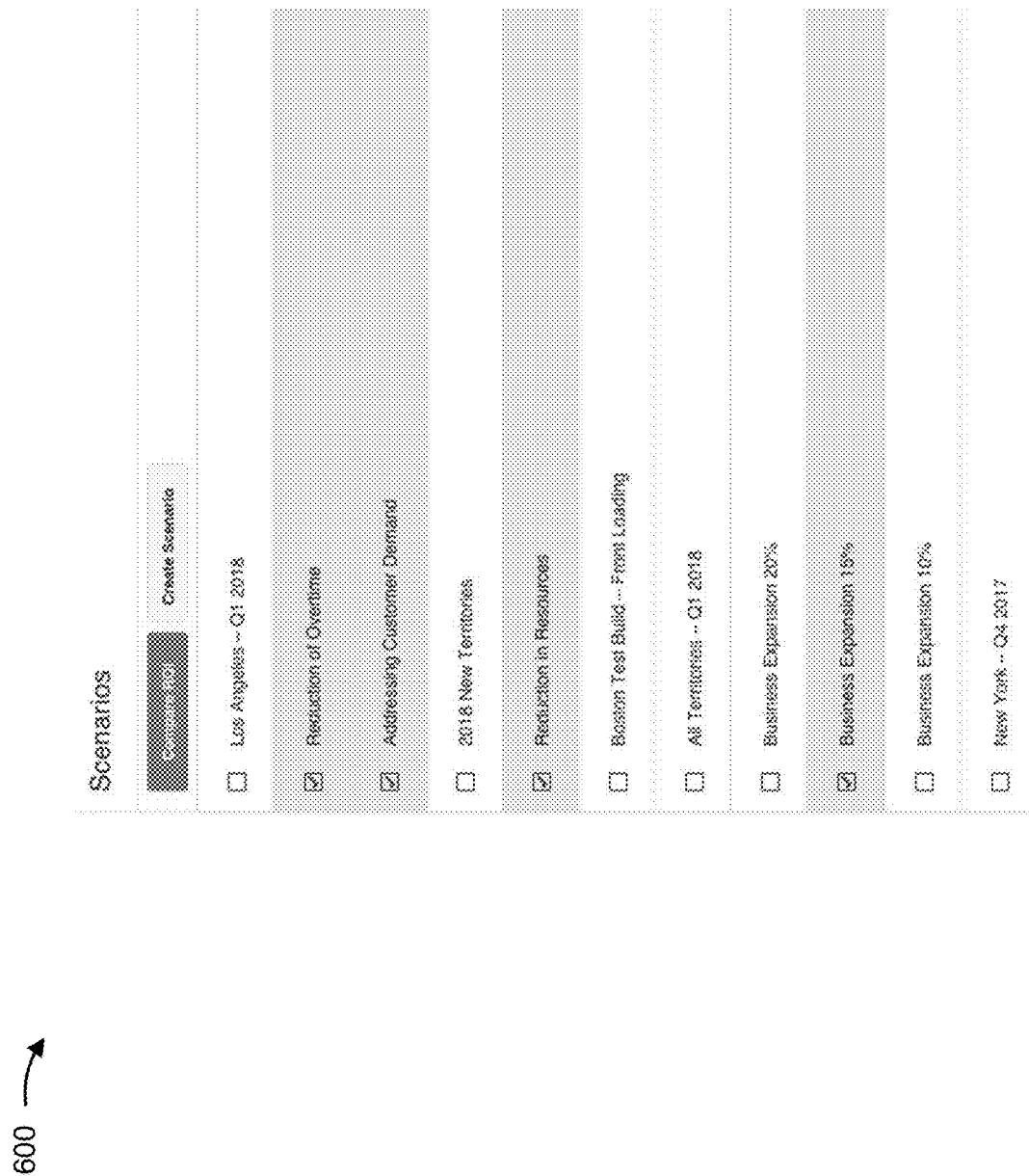

FIG. 6 is a diagram of an example user interface 600 via which a user can provide user input for selecting identifiers associated with the plurality of route planning scenarios. As shown in FIG. 6, a user can select the plurality of route planning scenarios based on identifiers associated with a list of available (e.g., previously created, default, and/or the like) route planning scenarios. In the example shown in FIG. 6, the user has selected a plurality of route planning scenarios including a "Reduction of Overtime" route planning scenario, an "Addressing Customer Demand" route planning scenario, a "Reduction in Resources" route planning scenario, and a "Business Expansion 15%" route planning scenario. As further shown, the user can provide scenario information associated with an additional scenario by selecting a "Create Scenario" button, if desired.

In this example, after the user selects the plurality of route planning scenarios and, user device 205 can provide information that identifies the plurality of route planning scenarios to route planning platform 215. Route planning platform 215 can receive the information that identifies the plurality of route planning scenarios, and can determine (e.g., based on scenario information stored or accessible by route planning platform 215) the scenario information associated with the plurality of route planning scenarios.

In some implementations, route planning platform 215 can be caused to calculate a set of metrics, associated with the plurality of route planning scenarios, based on a single user interaction a user interface displayed on user device 205 (e.g., by clicking on the "Compare ROI" button shown in FIG. 6), as described in further detail below.

As indicated above, FIG. 6 is provided merely as an example. Other examples are possible and can differ from what was described with regard to FIG. 6.

Returning to FIG. 4, and as further shown in FIG. 4, process 400 can include generating, based on the scenario information and the route planning information, a plurality of route plans corresponding to the plurality of route planning scenarios (block 430). For example, route planning platform 215 can generate, based on the scenario information and the route planning information, a plurality of route plans corresponding to the plurality of route planning scenarios.

In some implementations, route planning platform 215 can generate the plurality of route plans based on the scenario information and the route planning information. For example, route planning platform 215 can generate a first route plan based on the route planning information and scenario information associated with a first route planning scenario (e.g., a scenario associated with a first condition and/or a first configuration). Here, when generating the first route plan, route planning platform 215 can generate the route plan based on the first condition (e.g., a 5% increase in work orders as compared to those identified in the route planning information) and/or the first configuration (e.g., an indication that delivery time windows can be violated).

Continuing with this example, route planning platform 215 can generate a second route plan based on the route planning information and scenario information associated with a second route planning scenario (e.g., a scenario associated with a second condition and/or a second configuration). Here, when generating the second route plan, route planning platform 215 can generate the route plan based on the second condition (e.g., a number of available vehicles that is 5 fewer than the number identified in the route planning information) and/or the second configuration (e.g., an indication that maximum route times cannot be violated). Route planning platform 215 can generate additional route plans for other route planning scenarios identified in the scenario information in a similar manner. In this way, route planning platform 215 can generate the plurality of route plans, where each route plan is associated with a different route planning scenario, but is associated with the same route planning information.

In some implementations, route planning platform 215 can generate the plurality of route plans based on an indication to calculate a set of metrics associated with the plurality of route planning scenarios. For example, as described above, a user of user device 205 can interact with an input element of a user interface (e.g., a "Compare" button") after selecting the plurality of route planning scenarios. Here, user device 205, along with the scenario information and/or the information that identifies the plurality of scenarios, an indication that route planning platform 215 is to calculate a set of metrics associated with the plurality of route planning scenarios. In this example, route planning platform 215 can (e.g., automatically) generate the plurality of route plans based on the indication (e.g., such that route planning platform 215 can calculate the set of metrics, as described below).

As further shown in FIG. 4, process 400 can include calculating, based on the plurality of route plans, a set of set of metrics associated with the plurality of route planning scenarios (block 440). For example, route planning platform

215 can calculate, based on the plurality of route plans, a set of set of metrics associated with the plurality of route planning scenarios.

The set of metrics can include one or more metrics based on which the plurality of route planning scenarios can be compared (e.g., for purposes of selecting a route plan to be implemented).

For example, for each route planning scenario, the set of metrics can include a number of drivers needed to implement a corresponding route plan, a total number of vehicles needed to implement the corresponding route plan, and/or the like.

As another example, for each route planning scenario, the set of metrics can include a total distance of routes included in the corresponding route plan, a total working time associated with routes included in the corresponding route plan, a total driving time associated with routes included in the corresponding route plan, a total number routes in the corresponding route plan, and/or the like.

As still another example, for each route planning scenario, the set of metrics can include a total number of assigned unassigned work orders associated with the corresponding route plan, a total number of unassigned work orders associated with the corresponding route plan, a number of geographical territories covered by the corresponding route plan, a number of depots associated with the corresponding route plan, and/or the like.

As yet another example, for each route planning scenario, the set of metrics can include an indication of profitability of the corresponding route plan (e.g., an indication of whether the route plan provides an amount of revenue that is greater than, less than, or equal to a cost to implement the route plan; a total amount of revenue provided, and/or the like).

As another example, for each route planning scenario, the set of metrics can include a number of expected violations associated with the corresponding route plan (e.g., time window violations, data window violations, and/or the like).

As still another example, for each route planning scenario, the set of metrics can include an indication of vehicle capacity utilization associated with the corresponding route plan (e.g., a percentage of vehicles that are at 100% capacity, a percentage of vehicles that are at at least 80% capacity, and/or the like).

As yet another example, for each route planning scenario, the set of metrics can include cost metric, such as a total cost to implement the corresponding route plan, an average cost per work order, a cost per mile traveled, a total fuel cost, an average fuel cost per vehicle, a cost per driver, a cost per working hour, a cost per driving hour, and/or another type of cost metric.

As another example, for each route planning scenario, the set of metrics can include a revenue metric, such as a total amount of revenue associated with implementing the route plan, an average revenue per work order, an amount of revenue per mile traveled, an amount of revenue per vehicle, an amount of revenue per driver, an amount of revenue per working hour, an amount of revenue per driving hour, and/or another type of revenue metric.

As another example, for reach route planning scenario, the set of metrics can include a threshold-based metric, such as a number of routes expected to satisfy a timing threshold (e.g., shorter than 30 minutes, at least two hours, and/or the like), a number of routes that satisfy a distance threshold (e.g., shorter than 10 miles, longer than 60 miles, and/or the like), a number of routes with a cost that satisfies a threshold (e.g., at least $50.00, less than $10.00), a number of routes with an amount of revenue that satisfies a threshold (e.g., less than $10.00, at least $20.00, and/or the like), and/or another type of threshold-based metric.

Notably, the above identified metrics are provided merely as examples, and other types of metrics are possible.

In some implementations, route planning platform 215 can identify the set of metrics to be calculated for the plurality of route planning scenarios. For example, the user of user device 205 can select and/or identify (e.g., from a list, a drop down menu, a check box, and/or the like) information that identifies the set of metrics. As another example, the user can create a metric (e.g., a cost per hour of driving time for routes shorter than 22 minutes) via user device 205. In these examples, user device 205 can provide information associated with the set of metrics to route planning platform 215 (e.g., when user device 205 provides the scenario information and/or the information that identifies the plurality of route planning scenarios), and route planning platform 215 can identify the set of metrics accordingly.

As another example, route planning platform 215 can identify the set of metrics based on information stored or accessible by route planning platform 215, such as information that identifies a default set of metrics, information that identifies a particular set of metrics to be calculated for the user, information that identifies a particular set of metrics to be calculated for the particular user device 205, information that identifies a set of metrics to be calculated for the particular route planning information, and/or the like.

In some implementations, route planning platform 215 can calculate the set of metrics based on a single user interaction. For example, when the user interacts with a "Compare" button on a user interface associated with identifying the plurality of route planning scenarios, as described above, route planning platform 215 can receive an indication to calculate the set of metrics, and can proceed accordingly. In this way, efficiency in use of computing resources can be improved (e.g., as compared to the conventional technique described above).

In some implementations, route planning platform 215 can calculate the set of metrics for each route planning scenario of the plurality of route planning scenarios. In some implementations, route planning platform 215 can calculate the set of metrics based on information included in the plurality of route plans. Additionally, or alternatively, route planning platform 215 can calculate the set of metrics based on information stored or accessible by route planning platform 215, such as information that identifies an algorithm that determines a cost of a given route, an amount of revenue per given route, information that identifies an estimated cost per gallon of fuel, and/or the like. In some implementations, route planning platform 215 can calculate the set of metrics for each of the plurality of route planning scenarios (e.g., such that each metric is calculated for each route planning scenario).

As further shown in FIG. 4, process 400 can include providing information associated with the set of metrics (block 450). For example, route planning platform 215 can provide information associated with the set of metrics. In some implementations, route planning platform 215 can provide the information associated with the set of metrics to user device 205.

In some implementations, route planning platform 215 can provide the information associated with the set of metrics such that the information associated with the set of metrics can be displayed by user device 205 (e.g., for comparison by the user). In some implementations, the information associated with the set of metrics can be provided for display in a column view, a grid view, a graphical view, and/or the like. Example user interfaces are described below with regard to FIGS. 7A-7D.

In some implementations, route planning platform 215 can provide information associated with one or more metrics, of the set of metrics, after route planning platform 215 calculates the one or more metrics.

Additionally, or alternatively, route planning platform 215 can provide information associated with a first metric, of the set of metrics, before route planning platform 215 finishes calculating and/or begins calculating a second metric of the set of metrics. For example, if the second metric requires a comparatively greater length of time (e.g., a comparatively more complex calculation) than the first metric, route planning platform 215 can calculate the first metric and provide information associated with the first metric before beginning calculation of the second metric, while calculating the second metric, and/or the like. Here, route planning platform 215 can provide information associated with the second metric after route planning platform 215 provides the information associated with the first metric (e.g., such that the information associated with the first metric is displayed before the information associated with the second metric is displayed).

In some implementations, route planning platform 215 can store or have access to information that identifies an order in which to calculate each metric of the set of metrics. For example, route planning platform 215 can store or have access to information that identifies a first group of metrics (e.g., metrics requiring comparatively less complex calculation, such as a total number of routes, a total number of work orders complete, and/or the like) that are to be calculated before a second group of metrics (e.g., metrics requiring comparatively more complex calculation, such as an average cost per hour of driving time for routes that are expected to be longer than one hour, an average revenue for work orders completed on Sundays after 3:00p.m.; and/or the like). In this example, route planning platform 215 can identify metrics, to be calculated by route planning platform 215, that are included in the first group of metrics and the second group of metrics, and can calculate the metrics accordingly.

Similarly, route planning platform 215 can calculate the set of metrics based on priority information associated with the set of metrics (e.g., information that identifies an order in which the set of metrics are to be calculated), and can calculate the set of metrics and provide the associated information according to the priority information. In some implementations, the priority information can be default priority information (e.g., configured on route planning platform 215), can be provided via user input, and/or the like.

In this way, an amount of delay associated with providing the information associated with a particular metric, of the set of metrics, is reduced (i.e., a speed at which the information associated with the particular metric is provided is increased). Thus, an amount of delay associated with displaying the information associated with the particular metric to the user is reduced, thereby improving utility of the user interface at user device 205.

In some implementations, automatic selection of a route plan, associated with a particular route planning scenario of the plurality of route planning scenarios, can be performed (e.g., by route planning platform 215, by user device 205, and/or the like) based on the set of metrics. For example, route planning platform 215 and/or user device 205 can identify one or more route plans for which a set of respective metrics satisfy a threshold (e.g., satisfaction of all respective conditions at a lowest cost, satisfaction of all respective conditions with a highest amount of revenue, and/or the like), and can select the route plan accordingly.

In some implementations, an action can be (e.g., automatically) performed based on the automatic selection. For example, route planning platform 215 and/or user device 205 can send, via network 225, instructions to a user device of a driver of a vehicle to be leveraged in the route plan. In some implementations, the instructions can be automatically generated, and can be provided in the form of a text message, an email, a push notification, a calendar invite, and/or the like. In another example, in a case that the vehicle is autonomous, the instructions could cause the vehicle to begin the route, navigate to a particular location (e.g., a depot), and/or the like. In another example, information that identifies a vehicle, a driver, a target delivery window, and/or the like, associated with a given work order, can be automatically provided to a device at a depot associated with the work order (e.g., such that the work order can be processed at the depot in preparation for route execution).

In some implementations, the information associated with the set of metrics can be provided in the form of a notification (e.g., an SMS message, a push notification, an email, and/or the like), that the set of metrics and/or the route planes are ready for viewing (e.g., such that the user can select the route plan).

Additionally, or alternatively, that information associated with the set of metrics can be provided such that another type of action is automatically performed. For example, if the set of metrics, associated with a given (e.g., a preselected, default, highest priority, and/or the like) route plan, satisfies a threshold, the information associated with the set of metrics can be in the form of one or more instructions, automatically provided to drivers, vehicles, and/or the like, that cause the given route plan to be initiated.

As another example, the information associated with the set of metrics can be provided such that other information is automatically updated based on the set of metrics. As a particular example, information associated with a cost metric and/or information associated with a revenue metric can be provided such that an overall cost projection (e.g., a yearly projection, a monthly project, and/or the like) and/or an overall revenue projection is automatically updated based on the information associated with the cost metric and/or the information associated with the revenue metric.

As another example, the information associated with the set of metrics can be provided such that the information is shared for further action by one or more departmental entities associated with an organization that initiates, executes, monitors, manages, and/or the like, route plans. As a particular example, if the information associated with the set of metrics suggests that more resources are needed (e.g., if the set of metrics indicates that a given route plan requires more vehicles or drivers than are available), then the information associated with the set of metrics can be provided (e.g., via email, vias a text message, in a report, and/or the like) to a device associated with a human resources department, a finance department, and/or the like, for further action by those departments. As another particular example, if the information associated with the set of metrics suggests that a particular facility (e.g., a branch office, a warehouse, a depot, and/or the like) should be opened or closed in association with executing a given route plan, then the information associated with the set of metrics can be provided to a device associated with an operations department, a finance department, and/or the like, for further action by those departments.

In some implementations, the information associated with the set of metrics can be provided in the form of a report, a comma-separated values (CSV) file, a data export that is automatically imported into particular system (e.g., a finance system, an enterprise resource planning (ERP) system, a customer relationship management (CRM) system, etc.), and/or like.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

FIGS. 7A-7D are diagrams of example user interfaces 700 via which the information associated with the set of metrics can be displayed.

Figure 7A:

FIGS. 7A and 7B include example user interfaces in which the information associated with the set of metrics is displayed via a column view. In FIGS. 7A and 7B, information that identifies the set of metrics is displayed vertically on the left portion of the user interface, and the set of metrics, corresponding to each route planning scenario (e.g., Scenario 1, Scenario 2, and Scenario 3), is displayed in a respective column. In some implementations, as shown in the lower portion of FIG. 7A, the information that identifies one or more configurations, corresponding to the respective route planning scenarios, can be displayed (e.g., as a reminder to the user of which configuration(s) are associated with each route planning scenario).

Figure 7C:
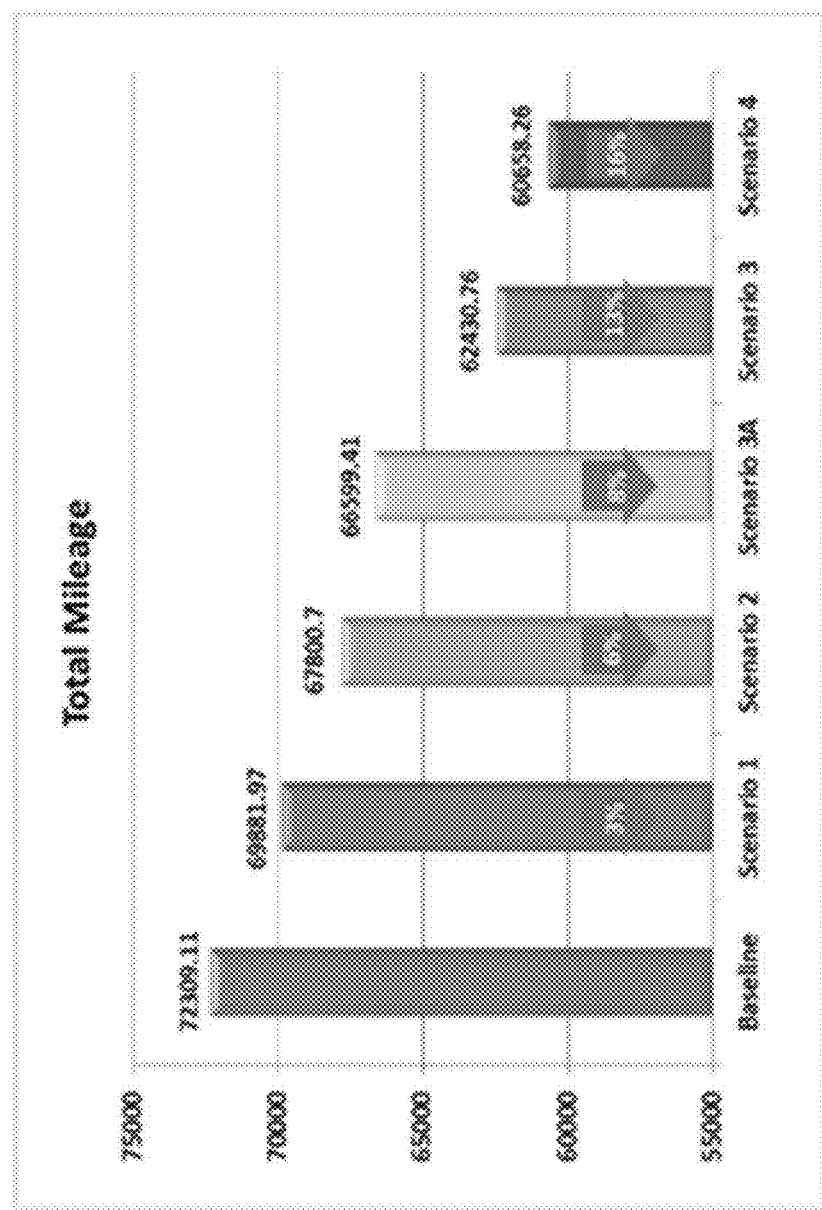
Figure 7D:
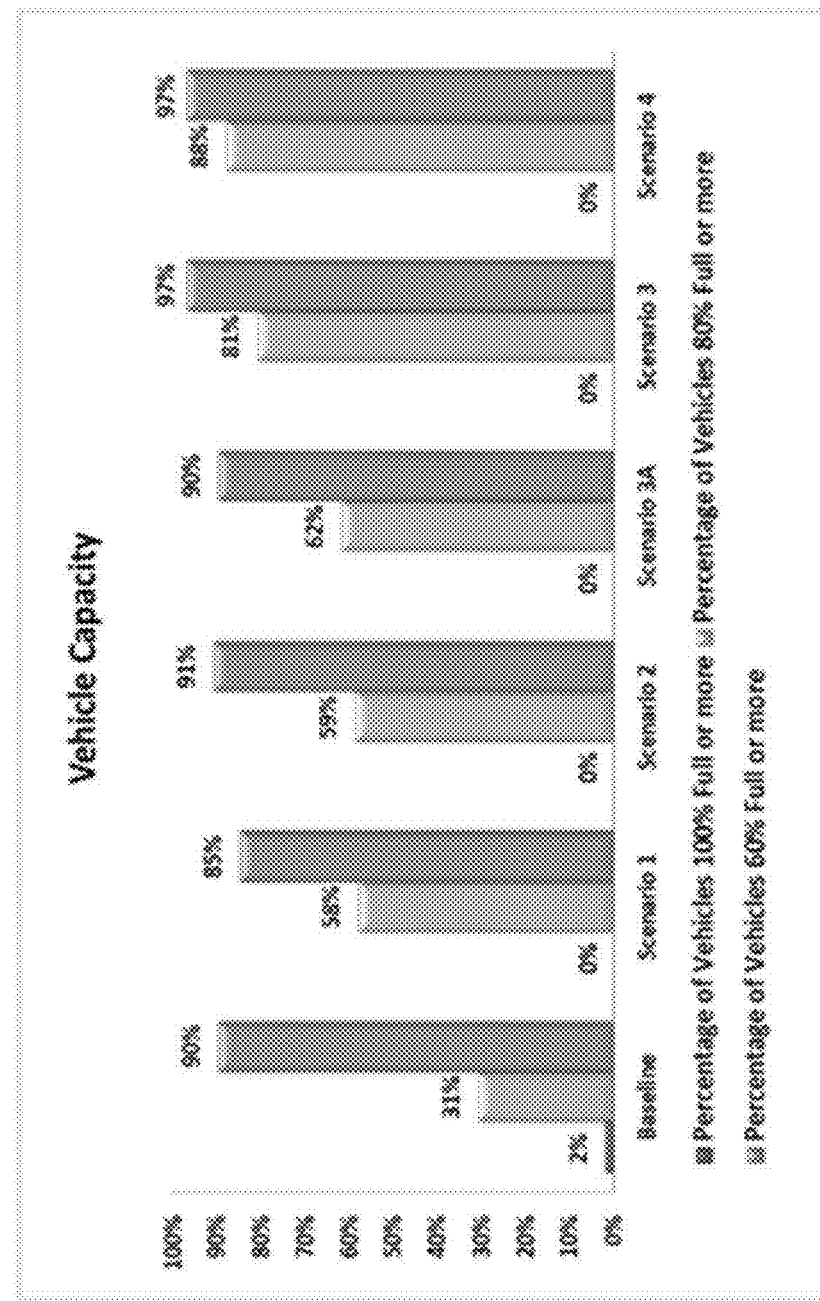

FIGS. 7C and 7D include example user interfaces in which the information associated with the set of metrics is displayed in a graphical view. FIG. 7C is a graphical view that includes total mileage for a plurality of route planning scenarios (e.g., a baseline scenario and scenarios 1 to 5), while FIG. 7D is a graphical view that includes vehicle capacity metrics for the plurality of route planning scenarios.

Notably, in the examples shown in FIGS. 7A-7D, the set of metrics is provided for display via a single user interface, thereby providing an output that facilitates comparison of the set of metrics for the plurality of route planning scenarios.

As indicated above, FIGS. 7A-7D are provided merely as examples. Other examples are possible and can differ from what was described with regard to FIGS. 7A-7D.

Some implementations described herein provide route planning platform 215 for calculating a set of metrics for a plurality of route planning scenarios and providing, for display, information associated with the set of metrics (e.g., for comparison by a user). In some implementations, route planning platform 215 can calculate the set of metrics based on a single user interaction (e.g., a so-called "one-click" interaction), and can provide the information associated with the set of metrics for display via a single user interface, thereby improving efficiency in use of computing resources while providing an output that allows facilitates comparison of the set of metrics for the plurality of route planning scenarios.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
determine scenario information associated with a plurality of route planning scenarios,
the scenario information including information that describes, for each route planning scenario of the plurality of route planning scenarios, a condition or a configuration based on which a respective route plan is to be generated;
receive, from a user device, information that identifies a set of metrics;
calculate, based on a plurality of route plans corresponding to the plurality of route planning scenarios and based on the information that identifies the set of metrics, the set of metrics associated with the plurality of route planning scenarios;
the set of metrics being calculated based on a single user interaction with a user interface of the user device; and
provide information associated with the set of metrics,
wherein the information associated with the set of metrics includes a comparison of the set of metrics for two or more route planning scenarios, of the plurality of route planning scenarios, provided for display via the user interface, and
wherein providing the information associated with the set of metrics causes an action, associated with at least one route plan of the plurality of route plans, to be automatically performed.

2. The device of claim 1, where the one or more processors, when determining the scenario information, are to:
determine the scenario information based on user input associated with the plurality of route planning scenarios.

3. The device of claim 1, where the one or more processors, when providing the information associated with the set of metrics, are to:
provide, for display, information associated with a first metric of the set of metrics,
the information associated with the first metric being provided for display before calculating a second metric, of the set of metrics, is completed.

4. The device of claim 1, where the one or more processors, when providing the information associated with the set of metrics, are to:
provide, for display, information associated with a first metric of the set of metrics,
the information associated with the first metric being provided for display after information associated with a second metric, of the set of metrics, is provided for display.

5. The device of claim 1, where the information associated with the set of metrics includes information that identifies at least one configuration associated with at least one route planning scenario of the plurality of route planning scenarios.

6. The device of claim 1, where the one or more processors, when providing the information associated with the set of metrics for display via the user interface, are to:
provide the information associated with the set of metrics for display via the user interface in a graphical view.

7. The device of claim 1, where the set of metrics includes an indication of profitability of at least one route plan of the plurality of route plans.

8. A non-transitory computer-readable medium storing instructions, the instructions comprising:
one or more instructions that, when executed by one or more processors, cause the one or more processors to:
determine scenario information associated with a plurality of route planning scenarios,
the scenario information including information that describes, for each route planning scenario of the plurality of route planning scenarios, a condition or a configuration based on which a respective route plan is to be generated;
receive, from a user device, information that identifies a set of metrics;
calculate, based on a plurality of route plans corresponding to the plurality of route planning scenarios and based on the information that identifies the set of metrics, the set of metrics associated with the plurality of route planning scenarios,
the set of metrics being calculated based on a single user interaction with a user interface of the user device; and
provide information associated with the set of metrics,
wherein the information associated with the set of metrics includes a comparison of the set of metrics for two or more route planning scenarios, of the plurality of route planning scenarios, provided for display via the user interface, and
wherein providing the information associated with the set of metrics causes an action, associated with at least one route plan of the plurality of route plans, to be automatically performed.

9. The non-transitory computer-readable medium of claim 8, where the one or more instructions, that cause the one or more processors to determine the scenario information, cause the one or more processors to:
determine the scenario information based on user input associated with the plurality of route planning scenarios.

10. The non-transitory computer-readable medium of claim 8, where the one or more instructions, that cause the one or more processors to provide the information associated with the set of metrics, cause the one or more processors to:
provide, for display, information associated with a first metric of the set of metrics,
the information associated with the first metric being provided for display before calculating a second metric, of the set of metrics, is completed.

11. The non-transitory computer-readable medium of claim 8, where the one or more instructions, that cause the one or more processors to provide the information associated with the set of metrics, cause the one or more processors to:
provide, for display, information associated with a first metric of the set of metrics, the information associated with the first metric being provided for display after information associated with a second metric, of the set of metrics, is provided for display.

12. The non-transitory computer-readable medium of claim 8, where the information associated with the set of metrics includes information that identifies at least one configuration associated with at least one route planning scenario of the plurality of route planning scenarios.

13. The non-transitory computer-readable medium of claim 8, where the one or more instructions, that cause the one or more processors to provide the information associated with the set of metrics for display via the user interface, cause the one or more processors to:
provide the information associated with the set of metrics for display via one or more of:
an email
a text message, or
a report.

14. The non-transitory computer-readable medium of claim 8, where the set of metrics include a number of expected violations associated with the at least one route plan.

15. A method, comprising:
determining, by a device, scenario information associated with a plurality of route planning scenarios,
the scenario information including information that describes, for each route planning scenario of the plurality of route planning scenarios, a condition or a configuration based on which a respective route plan is to be generated;
receiving, by the device and from a user device, information that identifies a set of metrics;
calculating, by the device and based on a plurality of route plans corresponding to the plurality of route planning scenarios and based on the information that identifies the set of metrics, flail the set of metrics associated with the plurality of route planning scenarios,
the set of metrics being calculated based on a single user interaction with a user interface of the user device; and
providing, by the device, information associated with the set of metrics,
wherein the information associated with the set of metrics includes a comparison of the set of metrics for two or more route planning scenarios, of the plurality of route planning scenarios, provided for display via the user interface, and
wherein providing the information associated with the set of metrics causes an action, associated with at least one route plan of the plurality of route plans, to be automatically performed.

16. The method of claim 15, where determining the scenario information comprises:
determining the scenario information based on user input associated with the plurality of route planning scenarios.

17. The method of claim 15, where providing the information associated with the set of metrics comprises:
providing, for display, information associated with a first metric of the set of metrics,
the information associated with the first metric being provided for display before calculating a second metric, of the set of metrics, is completed.

18. The method of claim 15, where providing the information associated with the set of metrics comprises:
providing, for display, information associated with a first metric of the set of metrics,
the information associated with the first metric being provided for display after information associated with a second metric, of the set of metrics, is provided for display.

19. The method of claim 15, where the information associated with the set of metrics includes information that identifies at least one configuration associated with at least one route planning scenario of the plurality of route planning scenarios.

20. The method of claim 15, where providing the information associated with the set of metrics via the user interface comprises:
providing the information associated with the set of metrics for display via the user interface in a graphical view.

* * * * *